G. C. THOMAS.
Nut-Locks.
No. 146,488. Patented Jan. 13, 1874.
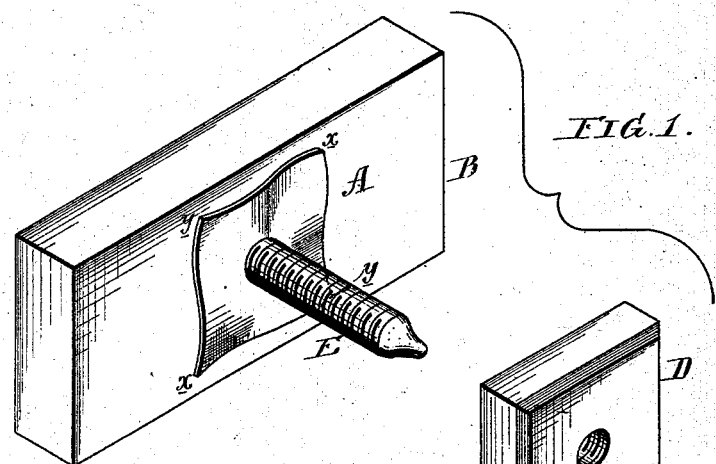
FIG. 1.
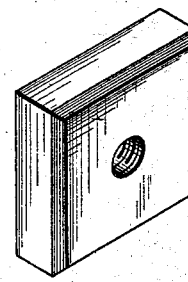
FIG. 3.
FIG. 2.
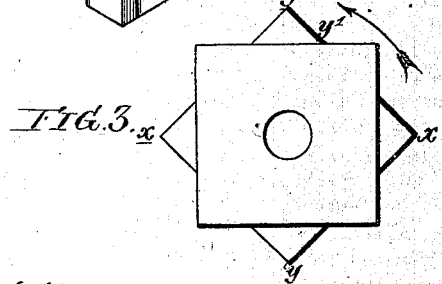
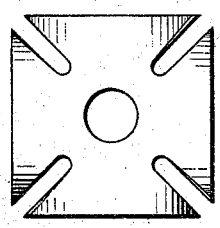
FIG. 4.
FIG. 5.
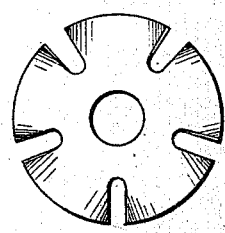
FIG. 6.
Witnesses, Harry Smith
Thomas McIlvain
Geo. C. Thomas.
By his Attys,
Howson and Son.

UNITED STATES PATENT OFFICE.

GEORGE C. THOMAS, OF BROOKLYN, NEW YORK.

IMPROVEMENT IN NUT-LOCKS.

Specification forming part of Letters Patent No. 146,488, dated January 13, 1874; application filed October 20, 1873.

*To all whom it may concern:*

Be it known that I, GEO. C. THOMAS, of Brooklyn, county of Kings and State of New York, have invented a Retaining-Washer for Nuts, of which the following is a specification:

The object of my invention is to prevent the nuts of bolts—such, for instance, as those used for rail-splices—from becoming loosened by the constant shocks and jars to which they are subjected; and this object I attain by an elastic washer, A, of the peculiar construction shown in the perspective view, Figure 1, of the accompanying drawing, the washer being so bent or twisted that, after it has been tightly compressed by the nut D against the object B, any attempt to turn back the said nut will be resisted by sharp edges of the washer, which is also prevented from being turned by other sharp edges bearing against the said object B.

E is the threaded stem of the bolt, passing through a rail-splice, or other object, B, to be tightened by the nut D, between which and the said object B I interpose the above-mentioned washer A, having a central opening for receiving the stem of the bolt, the latter having the usual head. This washer is made of thin steel, and is, in the present instance, square, and is so bent that each of its four edges shall be of the moved form represented in Fig. 2, the washer thus forming an elastic medium between the object B and the nut at all times, whatever may be the position of the said nut, and the elasticity of the washer always insuring the full retaining efficacy of its sharp edges.

The washer may be thus formed by subjecting the strip of steel to the action of dies of a suitable shape, and if the steel does not possess sufficient hardness and elasticity the washer should be properly hardened and tempered after the desired shape has been imparted to it.

On screwing the nut tight it will have a tendency to flatten the bent washer, and compress it against the object B.

Supposing the tightened nut to bear the relation shown in Fig. 3 to the washer, it will be evident that any attempt to unscrew the said nut by turning it in the direction of the arrow will be resisted, the sharp edges $y^1$ of the corners $y$ $y$, which are presented to the edge of the nut, and part of the metal of the latter, must be cut away before it can be turned past the said sharp edge $y^1$ of the hard washer A; at the same time any tendency of the nut on being turned to carry with it the washer will be resisted by the corners $x$ $x$, or, rather, by the sharp edges formed by bending these corners, which sharp edges must penetrate and cut away the metal of the object B before the washer can be turned.

It may be here remarked that the retaining properties of the washer are not dependent so much on its extreme corners as on the sharp edges formed by the bending of these corners, and the body of the washer to the shape shown. Even if the nut be turned back to a limited extent the washer will continue its retaining function, owing to its inherent elasticity.

In the modification illustrated in Figs. 4 and 5, a square washer is so slotted as to present twice as many corners as the washer A in Fig. 1, these corners being bent alternately in contrary directions, so as to present four sharp edges to resist the turning of the nut on the washer, and four sharp edges to resist the turning of the washer on the object against which it has been compressed by the nut.

In the modification, Fig. 6, the washer is round, and so slotted as to present ten corners, five of which are bent in one direction, and five in the other, with the same result as regards the retaining properties of the washer as that described on reference to Figs. 1 and 4.

I am aware that a washer with elastic turned-up corners acting as retainers of a nut, but otherwise non-elastic, have been heretofore used, a device which I disclaim, as these corners present obstacles to the proper tightening and adjustment of the nut; but

I claim as my invention—

The within-described washer, bent or twisted in the manner described so as to form an elastic bearing for the nut whatever may be the position of the latter, and so as to present the sharp retaining-edges, owing their efficacy to the elasticity of the washer, as specified.

In testimony whereof I have signed my name to this specification in the presence of two subscribing witnesses.

GEORGE C. THOMAS.

Witnesses:
H. LITTLEJOHN,
H. P. LEE, Jr.